March 7, 1967 W. H. EMERSON 3,308,463
ANECHOIC CHAMBER
Filed Aug. 4, 1964 3 Sheets-Sheet 1
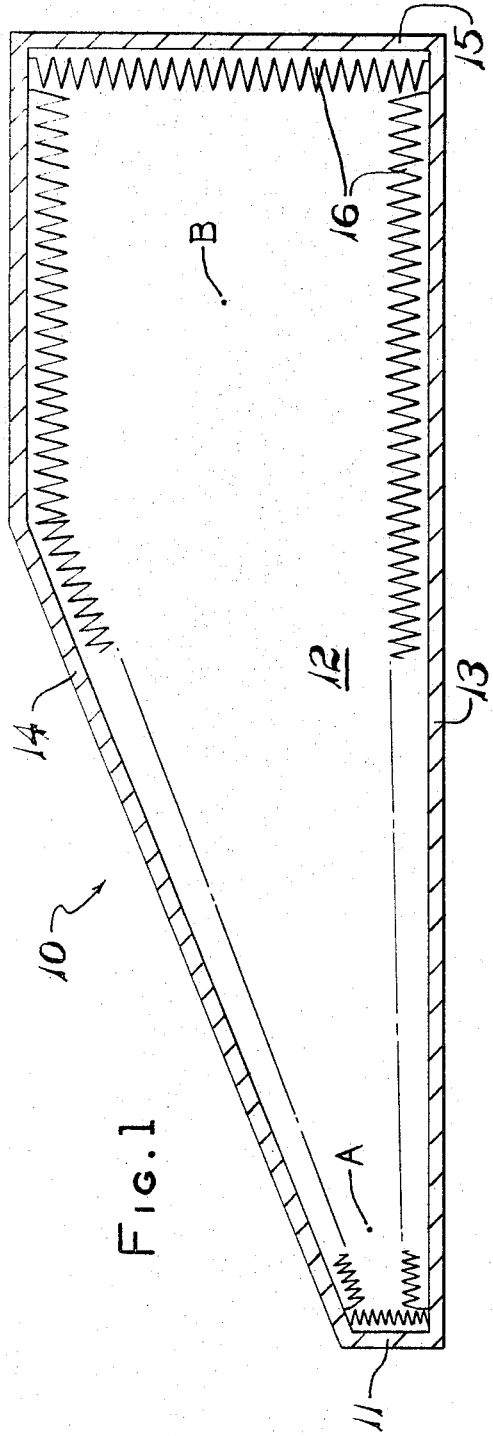
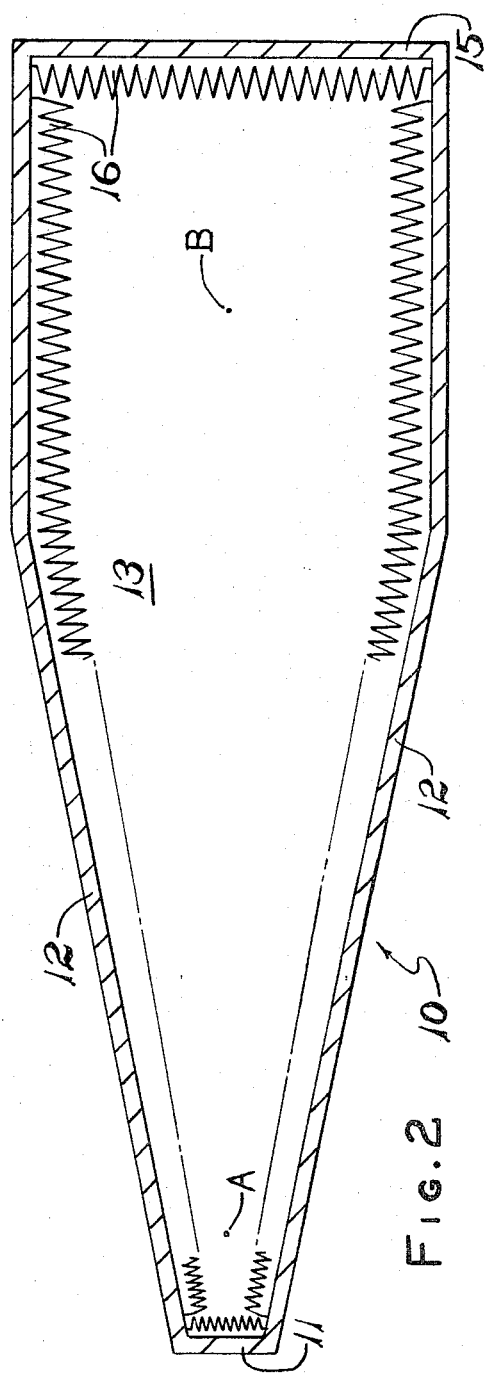
INVENTOR
WILLIAM H. EMERSON
BY
James R. Lindsay
ATTY.

INVENTOR
WILLIAM H. EMERSON
BY James R. Lindsay
ATTY.

March 7, 1967 W. H. EMERSON 3,308,463
ANECHOIC CHAMBER
Filed Aug. 4, 1964 3 Sheets-Sheet 3

INVENTOR.
WILLIAM H. EMERSON
BY James R. Lindsay
ATTY.

3,308,463
ANECHOIC CHAMBER
William H. Emerson, Huntington, Conn., assignor to The
B. F. Goodrich Company, New York, N.Y., a corporation of New York
Filed Aug. 4, 1964, Ser. No. 387,366
6 Claims. (Cl. 343—18)

This invention relates to an anechoic chamber suitable for evaluating and measuring the characteristics and properties of antennas and other electronic devices which ideally are studied in an environment which resembles that of outer space.

It is desirable when evaluating the characteristics and properties of certain electronic devices that the studies be undertaken in an environment in which there are no interfering energy disturbances that would introduce inaccuracies into the test data. Such an environment is found in outer space. However, since it is not practical to conduct actual testing of such devices in outer space, such evaluations customarily are conducted in test chambers that are designed to provide an interior environment approaching the echo-free environment encountered in outer space. Various anechoic test chamber constructions have been proposed. They have met with varying degrees of success in approaching an essentially echo-free environment.

Heretofore, such test chambers normally have been rectangular-shaped rooms which have varied widely in dimensions, ranging from rooms a few feet in length to chambers over 100 feet long. The interior of the chambers are lined with microwave energy absorbing material intended to absorb microwave energy impinged against the walls, floor or ceiling of the chamber and thereby prevent the energy from being reflected back into the interior of the chamber. Two general types of microwave energy absorbing material are available for such purposes. One type of absorbing material used for lining the interiors of anechoic chambers is characterized as narrow band absorber material. This type of absorbing material is a relatively thin sheet or panel of low dielectric material that effectively absorbs only a rather limited frequency band of microwave energy. The other principal type of absorbing material commonly is referred to as broad band absorbing material and is effective over a much greater frequency range than the narrow band material. The broad band absorber material is considerably thicker than narrow band absorbers, usually having a thickness of at least ¼ of the length of the longest wave length to which the absorbing material is to be exposed when in use. The specific purpose for which the anechoic chamber is intended should determine the type of microwave energy absorber material used for lining the chamber. However, to enable the chamber to be used for measuring the characteristics of electronic components over a rather wide frequency range broad band microwave energy absorber materials generally are preferred.

Broad band absorbing materials may be separated additionally into two distinct classes of absorbing materials depending upon the manner by which microwave energy impinged against it is absorbed. One such class of broad band absorbing material is similar to the narrow band absorber in that it is a flat panel. However, it differs from the narrow band absorbing material in that the microwave energy absorbing substance present in the broad band panel increases in proportion from the front face of the panel to the back face of the panel so that microwave energy entering the panel encounters an increasing concentration of the microwave energy absorbing material as it progresses through the thickness of the panel. The panel may consist, for example, of several layers of low dielectric constant material which have dispersed therein varying amounts of the microwave energy absorbing substance, the amount of energy absorbing material included in each successive layer being proportionally greater as the layers succeed from the front to the rear of the panel.

The other class of broad band absorber depends to a great extent upon the geometrical configuration of the absorber structure for ensuring acceptable absorption of the microwave energy and may be considered to be comprised of pyramidal-shaped or cone-shaped elements which project inwardly into the interior of the chamber and which are formed of a low density material that exhibits low dielectric properties and which is coated or impregnated with a substance that inherently absorbs microwave energy. It will be appreciated that, as the microwave energy impinges against the tapered surfaces of the pyramidal or conical shapes of the absorber panel, part of the energy penetrates into the absorber panel while a part of the energy is reflected. Because of the configuration of the absorber panel, essentially the entire reflected energy is reflected in a direction toward another absorbing surface of the panel rather than being reflected back into the interior of the chamber, as is explained in U.S. Patent 2,822,539 and U.S. Patent 2,870,439. Further discussion concerning microwave energy absorbing material is found in U.S. Patent 2,464,006 and U.S. Patent 2,977,591.

The electronic component to be evaluated in an anechoic chamber is placed at one end of the chamber facing toward a position at the opposite end of the chamber from which a microwave energy signal can be beamed toward the device under observation. Although the signal is beamed directly at the device being observed, it will be understood that as the signal leaves the source of energy illumination the energy waves tend to diverge to form a signal of constantly expanding cross-section. The microwave energy absorbing material which lines the side walls, floor and ceiling of the chamber is intended to absorb microwave energy which "strays" too far from the axis of the signal beam and impinges against these surfaces of the chamber. Ideally, all microwave energy impinged against the absorber material is absorbed so that no wave energy is reflected back into the interior of the chamber to cause interference with the signal beam and inaccuracies in the test data. Unfortunately, the microwave absorbing materials known today are not completely effective and some interference resulting from reflected wave energy is experienced. In view of the critical operating conditions under which electronic devices must function in the fields of radar and rocketry, it will be appreciated that any reduction in the amount of reflected energy experienced in an anechoic chamber will produce more accurate measurements defining the performance characteristics of the electronic component and provides more reliable information upon which to design radar units and space vehicles.

The present invention provides an anechoic chamber which not only is less expensive to construct than rectangular-shaped chambers, but also provides a chamber that is more effective for measuring the characteristics of electronic devices being studied therein than are the rectangular-shaped chambers. In accordance with this invention, the anechoic chamber is constructed with at least one of the longitudinally disposed interior faces of the chamber diverging with respect to one or more of the other longitudinal interior faces of the chamber as it extends from the front wall of the chamber (the illuminating end of the chamber from which the signal beam is transmitted) toward the device under study. As a consequence, the cross-sectional area of the interior of the anechoic chamber increases as it is measured from the front wall of the chamber toward the rear section of the chamber in which the electronic device to be evaluated is positioned for testing.

Since the signal beam as it recedes from the illuminating source expands in cross-section, it will be appreciated that there is no necessity for providing side walls, floor and ceiling which throughout their length correspond to the sides of a rectangular-shaped room since all that is required for proper chamber performance is to provide a generally cone-shaped structure between the illuminating transmitter and the device being evaluated that is sufficient in dimensions to accommodate the expanding signal without objectionably interfering with its transmission to the device under investigation. It also will be realized that the diverging wall or walls of the chamber reduce the interior surface area of the chamber, as compared to a rectangular-shaped chamber of equal overall height, length and width, and thereby reduces the amount of microwave energy absorber material required to line the interior of the chamber.

For convenience, the chamber frequently is constructed with a flat horizontal floor surface throughout its extent so that walkways can be furnished to permit the convenient mounting of a device in proper position for testing.

The employment of this invention in anechoic chamber structures allows a construction to be formed which is likened to that obtained by bending a tapered horn in one or more places. These latter constructions are of importance where space considerations prevent constructing a chamber of normal length.

The invention will be more clearly understood from the following description of several embodiments of the invention and from the drawings in which:

FIG. 1 is a side elevation view in section of an anechoic chamber constructed in accordance with this invention;

FIG. 2 is a plan view in section of the anechoic chamber shown in FIG. 1;

Figure 4:
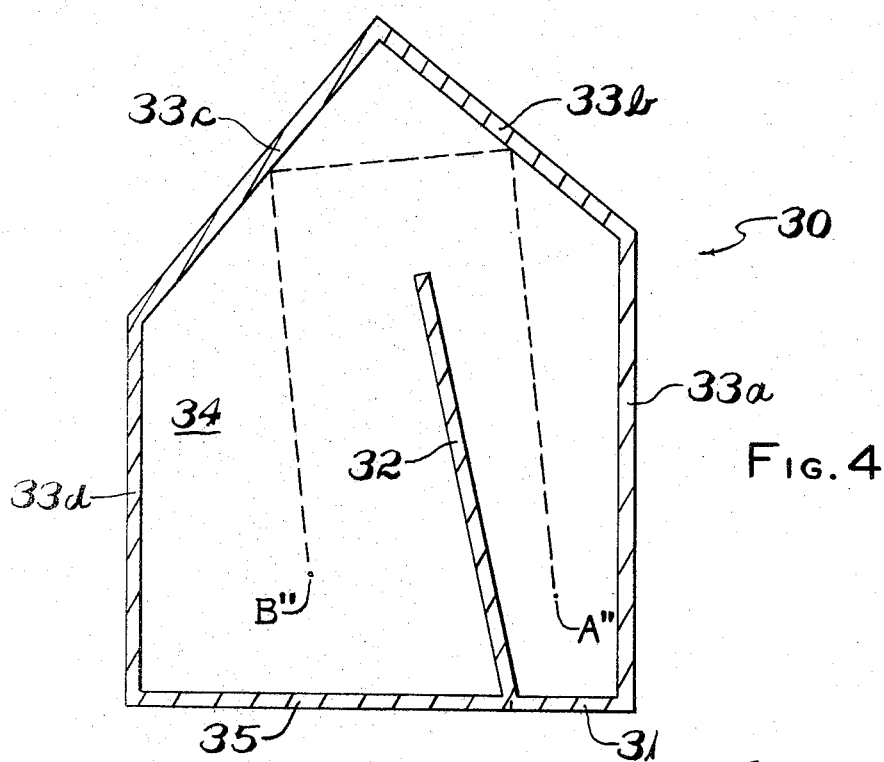
FIG. 4 is a plan view in section of a third embodiment of this invention.

With reference to the embodiment of the invention shown in FIGS. 1 and 2 of the drawings, the anechoic chamber 10 is comprised of a front wall 11, side walls 12, 12, floor 13, ceiling 14 and back wall 15. As is shown clearly in FIG. 1, the ceiling 14 of the chamber along a preponderance of its length diverges at a constant rate from the floor 13 as it (ceiling 14) extends longitudinally from the front wall 11 of the chamber toward the rear of the chamber. Also, as is clearly shown in FIG. 2, the side walls 12, 12 of the chamber along a preponderance of their lengths diverge at a constant rate with respect to each other and with respect to the longitudinal axis of the chamber as they extend longitudinally from the front wall 11 of the chamber toward the rear of the chamber. The construction provides a chamber interior which increases in cross-sectional area from the front wall 11 of the chamber toward the rear of the chamber. As a consequence, the front section of the chamber conforms more nearly in shape to the tapered shape of a diverging beam of microwave energy admitted from an illuminating signal device located in the front portion of the chamber (for example, at a position indicated by the letter A) and directed toward the rear of the chamber in which the device under evaluation is positioned (for example, at a position indicated by the letter B) than does a chamber that has a rectangular-shaped interior.

The walls, floor and ceiling of the chamber are formed of any conventional structural material, the specific structural material used in the chamber walls, floor and ceiling not forming a part of the present invention. The interior surfaces of the front, back and side walls and of the floor and ceiling of the chamber are lined with microwave energy absorbing material 16 which is intended to absorb microwave energy directed against it and prevent the reflection of such microwave energy back into the interior of the chamber. The particular lining material 16 chosen to line the interior surfaces of the chamber will vary depending upon the requirements of the chamber. Usually, broad band absorbing materials are selected for lining the interior surfaces of the chamber so that the chamber can be utilized for evaluating devices over a greater frequency range thereby providing the chamber with greater versatility. A flat panel-type broad band absorbing material normally is used to form walkways on which one can walk in the interior of the chamber and in areas where the protruding pyramids or cones of the geometrical-type broad band absorbing material would be impractical or unsuitable because of space limitations. However, since the geometrical-type broad band absorbing material is more effective, it normally is used to line the interior of the chamber wherever practical.

The chamber 10 is provided with a door (not shown) through which entrance into the chamber can be achieved in order to position the device within the chamber for evaluation. Usually the device is mounted on a pedestal rising from the floor of the chamber so that the device in essence is "suspended" within the interior of the chamber rather than resting on the chamber floor. The signal-emitting transmitter which beams microwave energy toward the device under study is located either in the front part of the chamber, such as at position A, or is located exteriorly of the chamber but positioned to direct the signal beam through a port or window (not shown) provided in the front wall of the chamber.

Figure 3:
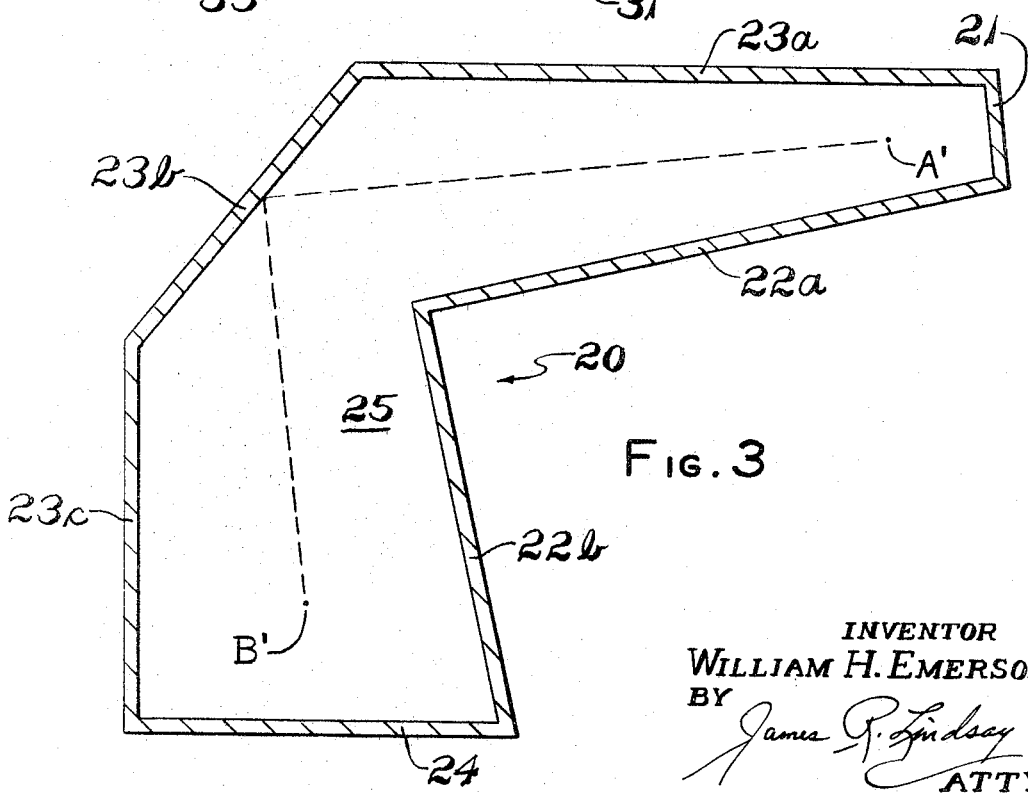
FIG. 3 is a plan view in section of a second embodiment of this invention.

The embodiment of the invention shown in FIG. 3 of the drawings illustrates a variation of the invention which is useful when space considerations do not permit the use of a relatively long and narrow structure such as shown in FIGS. 1 and 2. The anechoic chamber 20 shown in FIG. 3 differs from chamber 10 in that instead of the chamber extending in one direction for its entire length, as does the chamber 10 shown in FIGS. 1 and 2, the longitudinal direction of the chamber 20 changes direction in order that the chamber can be positioned in a smaller space where there is a limitation on the length of chamber that can be accommodated in the space. The chamber 20 is constructed of a front wall 21, one side wall composed of two sections 22a and 22b, a second side wall composed of three sections 23a, 23b and 23c, a back wall 24, a floor 25 and a ceiling (not shown). It will be observed that side wall section 22a diverges at a constant rate from side wall section 23a as these sections extend from front wall 21 rearwardly into the chamber 20 and that side wall section 22b diverges at a constant rate from side wall section 23c as they extend toward the back wall 24 of the chamber 20.

The interior surfaces of the walls of the chamber 20 (with the exception of side wall section 23b) and the floor and ceiling of the chamber 20 are lined with microwave energy absorbing material (not shown) for absorbing microwave energy directed against them. The interior surface of said wall section 23b, however, is provided with a microwave reflecting surface (a flat metal surface, for example) in order to reflect microwave energy directed against the reflecting surface for reasons which will become apparent from subsequent discussion.

The beam of microwave energy emitted from an illuminating device positioned at the front end of the chamber (at point A', for example) and directed along the path indicated by the dash line will strike the reflecting surface of said wall section 23b and be reflected toward the rear of the chamber 20 at an agle such that the angle of incidence equals the angle of reflection. A device under evaluation is positioned in the rear portion of the chamber 20 in the path of the reflected beam (at position B', for example) and can be evaluated in the same manner as is a device under study in an anechoic chamber such as the one shown in FIGS. 1 and 2. The effective length of the chamber 20 is the distance between the front wall 21 and the back wall 24 measured along the axis of the beam of microwave energy.

A third embodiment of the invention is shown in FIG. 4. The anechoic chamber 30 shown in FIG. 4 is similar to chamber 20 in that the longitudinal extent of the chamber changes direction and differs from chamber 20 in that the longitudinal direction of chamber 30 changes direction twice whereas the longitudinal direction of chamber 20 changes direction only once. It will be observed that the chamber construction of chamber 30 permits the chamber to be accommodated in a significantly smaller space than either chamber 10 or chamber 20 even though the effective lengths of the three chambers are equal.

Chamber 30 is formed with a front wall 31, a side wall 32, a side wall composed of sections 33a, 33b, 33c and 33d, a floor 34, a ceiling (not shown) and back wall 35. It will be observed that side wall 32 forms a common wall separating the front portion of the chamber 30 from the rear section of the chamber. It also will be noted that side wall 32 diverges at a constant rate from side wall section 33a as they extend away from the front wall 31 of the chamber and that side wall 32 diverges at a constant rate from side wall section 33d as they approach the back wall 35 of the chamber.

The interior surfaces of front wall 31, side wall sections 33a and 33d, back wall 35, floor 34, the chamber ceiling and all surfaces of side wall 32 exposed to the interior of the chamber are lined with microwave energy absorbing material (not shown). The interior surfaces of side wall sections 33b and 33c are provided with a reflecting surface for the purpose of reflecting microwave energy impinged thereagainst so that a beam of microwave energy emitted from an illuminating device positioned at point A″ and directed along the path indicated by the dash line toward side wall 33b will be reflected from side wall 33b to side wall 33c and then reflected toward the back wall 35 of the chamber toward the device under study positioned at point B″.

Figure 5:
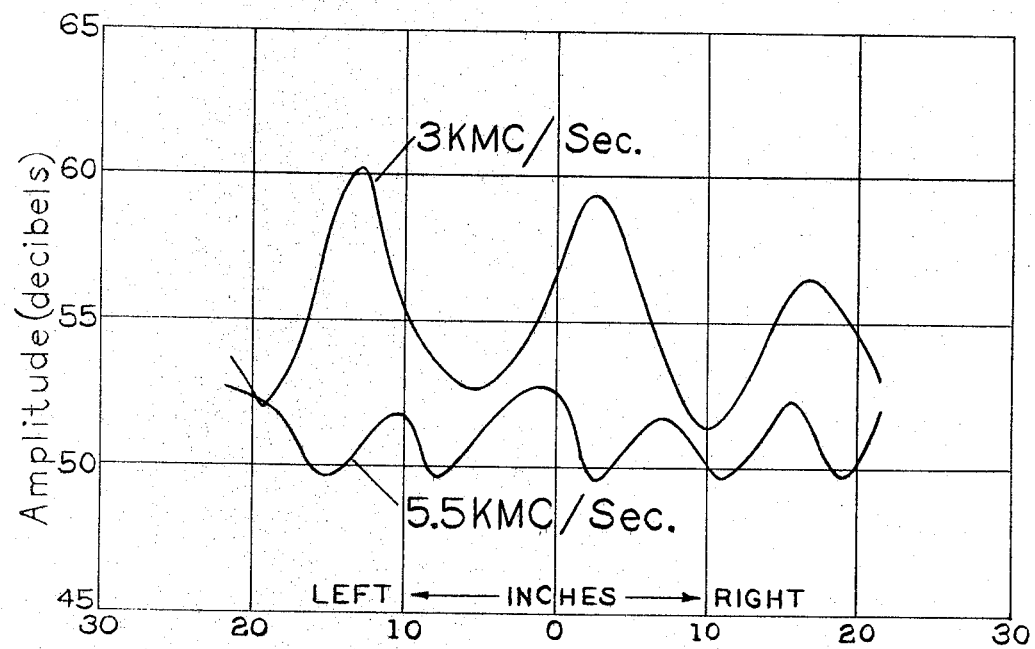
FIG. 5 is a graph illustrating characteristics of a rectangular-shaped anechoic chamber.
Figure 6:
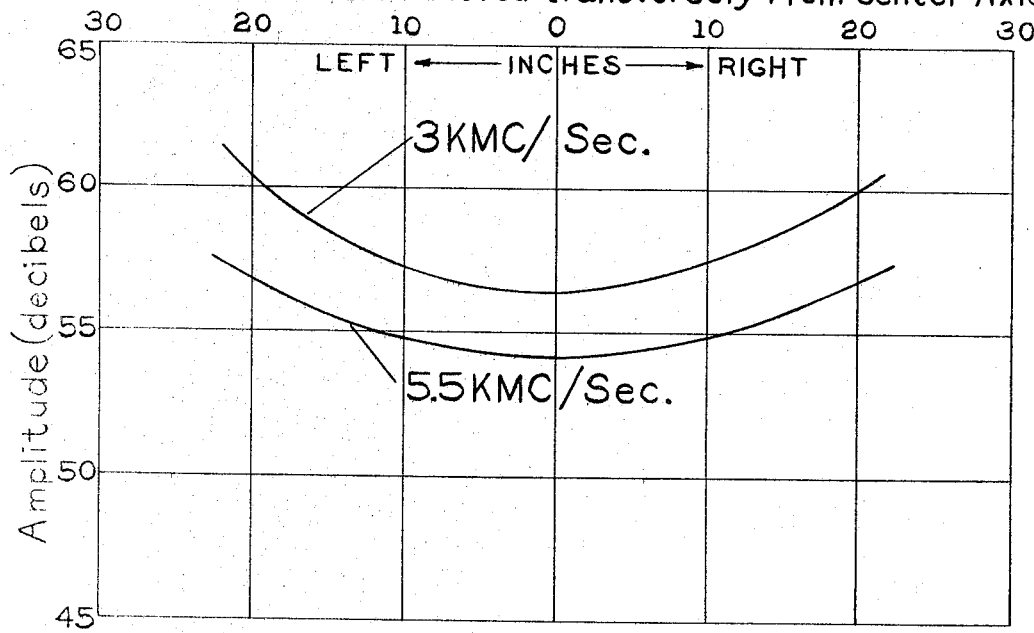
FIG. 6 is a graph illustrating characteristics of an anechoic chamber of the same overall length, height and width as the chamber to which the graph of FIG. 5 pertains but embodying the present invention.

FIGS. 5 and 6 illustrate the improved performance of an anechoic chamber constructed in accordance with this invention as compared to a rectangular-shaped chamber of the same overall dimensions. The graphs of FIG. 5 represent test data collected in a rectangular-shaped anechoic chamber measuring 6 feet wide, 6 feet high and 22 feet long. The graphs of FIG. 6 reflect data obtained using a tapered chamber measuring 22 feet in length which had a rear section measuring 6 feet wide, 6 feet high and 6 feet long. One side wall of the tapered chamber and the floor were flat while the other side wall and the ceiling tapered starting at a distance of 6 feet forward of the back wall and converged toward their respective opposite walls. The exterior surface of the front wall of the chamber was a square one foot on a side. A transmitting device was positioned in each of the chambers in front of the front walls of the respective chambers and receiving antennas were positioned in the rear of the chambers. The distance in front of the front walls of the chamber at which the transmitting devices were located was selected so that the dimensions of the cross-sectional shape of the interior of the tapered chamber at the place at which the transmitter was located approximately equaled the aperture of the receiving antenna. Tests were conducted by moving the receiving antennas laterally in the chambers and measuring the amplitude of signals received from each antenna at the different positions. Both chambers were evaluated under similar conditions with data collected at an illumination energy of 3 kilomegacycles per second and 5.5 kilomegacycles per second.

The movement of the antenna in a perfect test chamber wherein all microwave energy impinged against the chamber walls is absorbed with no reflection of microwave energy back into the interior of the chamber produces only monotonic changes in the amplitude of the energy received by the receiving antenna. On the other hand, in a chamber where reflection of microwave energy from the side walls of the chamber into the interior of the chamber is significant periodic variations in the amplitude of the energy received by the receiving antenna is expected as a result of the interference of the reflected wave energy with the signal being beamed at the receiving antenna. This variation in amplitude becomes more severe as the frequency of the signal is decreased because of higher levels of reflected energy. Referring to FIG. 5 it is noted that objectionable variation in the amplitude of the energy received by the receiving antenna occurs in the rectangular-shaped chamber when the receiving antenna is moved transversely in the chamber and that the variations are periodic in nature. However, FIG. 6 indicates that the amplitude of energy received by the receiving antenna does not vary periodically in the tapered chamber when the receiving antenna is moved transversely in the chamber indicating significantly less reflection of energy from the side walls of the tapered chamber than occurs in the rectangular chamber.

I claim:

1. An anechoic chamber for providing an environment simulating that of outer space in which electronic devices can be evaluated and studied, said chamber comprising a back wall toward which microwave energy is directed from the front of the chamber during the evaluation and study of electronic devices in said chamber, a front wall and longitudinally disposed walls connecting said front wall with said back wall and comprised of a ceiling, a floor and opposed side walls, the interior wall surfaces of said chamber being lined with microwave energy absorbing material for absorbing microwave energy impinged thereagainst, said ceiling of said chamber diverging from the floor of the chamber at a constant rate beginning at the front wall of the chamber and extending rearwardly a preponderance of the longitudinal length of the chamber whereby the cross-sectional area of the chamber progressively increases from the front wall of the chamber rearwardly in the region of said divergence.

2. An anechoic chamber for providing an environment simulating that of outer space in which electronic devices can be evaluated and studied, said chamber comprising a back wall toward which microwave energy is directed from the front of the chamber during the evaluation and study of electronic devices in said chamber, a front wall and longitudinally disposed walls connecting said front wall with said back wall, the interior wall surfaces of said chamber being lined with microwave energy absorbing material for absorbing microwave energy impinged thereagainst, at least one of said longitudinally disposed walls of said chamber diverging from its opposing longitudinally disposed wall at a constant rate beginning at the front wall of the chamber and extending rearwardly a preponderance of the longitudinal length of the chamber whereby the cross-sectional area of the chamber progressively increases from the front wall of the chamber rearwardly in the region of said divergence.

3. An anechoic chamber for providing an environment simulating that of outer space in which electronic devices can be evaluated and studied, said chamber comprising a back wall toward which microwave energy is directed from the front of the chamber during the evaluation and study of electronic devices in said chamber, a front wall and longitudinally disposed walls connecting said front wall with said back wall and comprised of a ceiling, a floor and opposed side walls, the interior wall surfaces of said chamber being lined with microwave energy absorbing material for absorbing microwave energy impinged thereagainst, said longitudinally disposed opposed side walls diverging from each other at a constant rate beginning at the front wall of the chamber and extending rearwardly a preponderance of the longitudinal length of the chamber whereby the cross-sectional area of the chamber progressively increases from the front wall of the chamber rearwardly in the region of said divergence.

4. An anechoic chamber for providing an environment simulating that of outer space in which electronic devices can be evaluated and studied, said chamber comprising a back wall toward which microwave energy is directed from the front of the chamber during the evaluation and study of electronic devices in said chamber, a front wall and longitudinally disposed walls connecting side front wall with said back wall and comprised of a ceiling, a floor and opposed side walls, the interior wall surfaces of said chamber being lined with microwave energy absorbing material for absorbing microwave energy impinged thereagainst, said longitudinally disposed opposed side walls diverging from each other at a constant rate beginning at the front wall of the chamber and extending rearwardly a preponderance of the longitudinal length of the chamber and said ceiling of said chamber diverging from the floor of the chamber at a constant rate beginning at the front wall of the chamber and extending rearwardly a preponderance of the longitudinal length of the chamber whereby the cross-sectional area of the chamber progressively increase from the front wall of the chamber rearwardly in the region of said divergence.

5. An anechoic chamber for providing an environment simulating that of outer space in which electronic devices can be evaluated and studied, said chamber comprising a back wall toward which microwave energy is directed from the front of the chamber during the evaluation and study of electronic devices in said chamber, a front wall and longitudinally disposed walls connecting said front wall with said back wall, said chamber comprising a longitudinaly disposed wall which diverges from an opposed longitudinally extending wall as the said walls extend rearwardly from the front wall of the chamber whereby the cross-sectional area of the chamber progressively increases from the front wall of the chamber rearwardly in the region of said divergence, the longitudinal direction of said chamber changing direction in a horizontal plane whereby the chamber can be constructed in a space of less length than the effective longitudinal length of the chamber, the area of the side wall of the chamber against which a beam of microwave energy emitted from the front portion of the chamber along the longitudinal axis of the chamber would strike being provided with an interior surface which reflects microwave energy, said area of the side wall provided with the said reflective surface being angled so that the beam of microwave energy reflected therefrom is reflected rearwardly along a path which coincides with the longitudinal axis of the chamber.

6. An anechoic chamber for providing an environment simulating that of outer space in which electronic devices can be evaluated and studied, said chamber comprising a back wall toward which microwave energy is directed from the front of the chamber during the evaluation and study of electronic devices in said chamber, a front wall and longitudinally disposed walls connecting said front wall with said back wall and comprised of a ceiling, a floor and opposed side walls, the interior wall surfaces of said chamber being lined with microwave energy absorbing material for absorbing microwave energy impinged thereagainst, at least one of said longitudinally disposed walls of said chamber constantly diverging from its opposing longitudinally disposed wall beginning at the front wall of the chamber and extending rearwardly a preponderance of the longitudinal length of the chamber whereby the cross-sectional area of the chamber progressively increases from the front wall of the chamber rearwardly in the region of said divergence.

References Cited by the Examiner

UNITED STATES PATENTS

| 2,474,384 | 6/1949 | Sunstein | 343—18 |
| 2,656,535 | 10/1953 | Neher | 343—18 |
| 3,100,870 | 8/1963 | Smith | 343—18 |
| 3,113,271 | 12/1963 | Buckley | 343—18 X |

OTHER REFERENCES

Emerson and Cuming Condensed Catalogue, pp. 9 and 10 of "Eccosorb Anechoic Chambers," 1960.

CHESTER L. JUSTUS, *Primary Examiner.*

LEWIS H. MYERS, *Examiner.*

J. P. MORRIS, *Assistant Examiner.*